United States Patent
Igarashi et al.

(10) Patent No.: US 9,620,799 B2
(45) Date of Patent: Apr. 11, 2017

(54) ELECTRIC POWER SUPPLY SYSTEM

(71) Applicant: HONDA MOTOR CO., LTD., Tokyo (JP)

(72) Inventors: Daishi Igarashi, Utsunomiya (JP); Morio Kayano, Utsunomiya (JP); Takuya Shirasaka, Sakura (JP); Kosuke Higashitani, Kawachi-gun (JP); Kenichi Shimizu, Utsunomiya (JP); Shuichi Kazuno, Utsunomiya (JP); Yasutaka Sakai, Shioya-gun (JP)

(73) Assignee: HONDA MOTOR CO., LTD., Tokyo (JP)

( * ) Notice: Subject to any disclaimer, the term of this patent is extended or adjusted under 35 U.S.C. 154(b) by 243 days.

(21) Appl. No.: 14/024,182

(22) Filed: Sep. 11, 2013

(65) Prior Publication Data
US 2014/0080024 A1    Mar. 20, 2014

(30) Foreign Application Priority Data
Sep. 18, 2012    (JP) .................. 2012-204796

(51) Int. Cl.
*H01M 8/04*       (2016.01)
*H01M 8/04492*    (2016.01)
(Continued)

(52) U.S. Cl.
CPC ..... *H01M 8/04529* (2013.01); *H01M 8/0494* (2013.01); *H01M 8/04723* (2013.01)

(58) Field of Classification Search
CPC .......... H01M 8/04529; H01M 8/0494; H01M 8/04723; Y02E 60/50
See application file for complete search history.

(56) References Cited

U.S. PATENT DOCUMENTS

2005/0153181 A1    7/2005  Saliger et al.
2007/0248857 A1*  10/2007  Kurosawa .................. 429/22
(Continued)

FOREIGN PATENT DOCUMENTS

CN    101032962 B     5/2010
DE    102004001424 A1  8/2005
(Continued)

OTHER PUBLICATIONS

Nave, C. R. Doing It by the Numbers: Javascript Calculations in Web-Based Instructional Material. Aug. 2, 2000. AAPT Summer Meeting, Guelph, Ontario. http://hyperphysics.phy-astr.gsu.edu/hbase/electric/imped.html.*
(Continued)

*Primary Examiner* — Ula C Ruddock
*Assistant Examiner* — Lisa S Park
(74) *Attorney, Agent, or Firm* — Westerman, Hattori, Daniels & Adrian, LLP (57) ABSTRACT

There are provided: a power supply provided with a fuel cell; a fuel cell vehicle; an inverter device capable of supplying electric power that is supplied from the fuel cell to an external load; a radiator; a radiator fan; a dryness detection device that detects a dry condition of the fuel cell; and an ECU that control supply of electric power to the external load. The ECU drives the radiator fan when the dryness detection device detects dryness of the fuel cell while electric power is being supplied from the fuel cell to the external load.

4 Claims, 8 Drawing Sheets

(51) Int. Cl.
*H01M 8/04701* (2016.01)
*H01M 8/04828* (2016.01)

(56) References Cited

U.S. PATENT DOCUMENTS

| | | | |
|---|---|---|---|
| 2007/0259229 | A1 | 11/2007 | Tung et al. |
| 2010/0323261 | A1* | 12/2010 | Igarashi et al. ............... 429/436 |
| 2011/0177416 | A1* | 7/2011 | Suematsu et al. ............ 429/440 |
| 2011/0311889 | A1* | 12/2011 | Furusawa ......... H01M 8/04029 429/413 |

FOREIGN PATENT DOCUMENTS

| | | |
|---|---|---|
| DE | 102007020750 A1 | 11/2007 |
| DE | 112011101707 T5 | 3/2013 |
| JP | 2003-23706 A | 1/2003 |
| JP | 2006-325392 A | 11/2006 |
| JP | 2007-220322 A | 8/2007 |
| JP | 2008-130471 A | 6/2008 |
| JP | 2009-16082 A | 1/2009 |
| JP | 2011-18461 A | 1/2011 |
| JP | 2012-3981 A | 1/2012 |
| WO | 2011/144978 A2 | 11/2011 |

OTHER PUBLICATIONS

Office Action dated Apr. 21, 2015, issued in Chinese Patent Application No. 201310412264.3, with Partial English translation (8 pages).
Japanese Office Action dated May 7, 2014, issued in Japanese Patent Application No. 2012-204796, w/English translation (5 pages).
German Search Report dated Oct. 2, 2013, issued in corresponding German Patent Application No. 102013217982.0 with English translation (10 pages).

* cited by examiner

ELECTRIC POWER SUPPLY SYSTEM

CROSS-REFERENCE TO RELATED APPLICATION

Priority is claimed on Japanese Patent Application No. 2012-204796, filed Sep. 18, 2012, the contents of which are incorporated herein by reference.

BACKGROUND

Technical Field

The present invention relates to an electric power supply system.

Background Art

Heretofore, there has been proposed an electric power supply system in which a direct current power supply such as a battery and fuel cell mounted on an electric vehicle such as an electric automobile and a fuel cell automobile is used to supply electricity to household electrical devices (for example, refer to Japanese Unexamined Patent Application, First Publication No. 2006-325392).

The electric power supply system disclosed in Japanese Unexamined Patent Application, First Publication No. 2006-325392 comprises: a vehicle having a means for supplying electric power to the outside of the vehicle; a stationary fuel cell system provided with an inverter; a load device that receives electric power supply from the stationary fuel cell system; and a system power supply that supplies electric power to the stationary fuel cell system. In the event of a power outage, this electric power supply system connects the vehicle and the stationary fuel cell system, and supplies electric power from the vehicle to the load device via the inverter of the stationary fuel cell system.

As a fuel cell, there is known a fuel cell stack in which a membrane electrode assembly is formed by arranging an anode electrode and a cathode electrode on either side of a solid polymer electrolyte membrane (hereunder, referred to as "electrolyte membrane"), arranging a pair of separators on either side of this membrane electrode assembly to form a flat unit fuel cell (hereunder, referred to as "unit cell"), and then stacking a plurality of these unit cells together to form a fuel cell stack. In this fuel cell, hydrogen ions produced by a catalytic reaction at the anode pass through the electrolyte membrane and move toward the cathode. There, they react with the oxygen in the air, giving rise to an electrochemical reaction and the generation of electric power.

The fuel cell described above generates heat as electric power generation is performed, and therefore, the generated water produced as a result of the electric power generation in the fuel cell is likely to vaporize. The generated water that has vaporized (water vapor) is discharged together with cathode off-gas and anode off-gas, and as a result, the electrolyte membrane of the fuel cell becomes dry. If the fuel cell becomes excessively dry (hereunder, referred to as "dry-up condition"), there is a problem in that the power generation performance of the fuel cell becomes reduced, and this consequently leads to deterioration in the electrolyte membrane.

Therefore, the fuel cell system is provided with a cooling device for cooling the fuel cell which generates heat as power generation is performed. The cooling device is formed with a coolant that circulates in the fuel cell and absorbs heat, a radiator for releasing heat from the coolant, and a radiator fan that blows air to the radiator.

Incidentally, in general, cooling devices of fuel cells and control thereof are designed in consideration of a vehicle in a state of traveling.

Specifically, they are designed such that in those cases where the traveling speed of the vehicle is high and the amount of electric power being generated by the fuel cell is high, traveling air stream is introduced into the radiator and the radiator fan is rotated at a high rotation speed, to release the heat of the coolant flowing through the radiator. Moreover, they are designed such that in those cases where the traveling speed of the vehicle is low and the amount of electric power being generated by the fuel cell is low, traveling air stream is introduced into the radiator and the radiator fan is rotated at a low rotation speed, to release the heat of the coolant flowing through the radiator. As a result of this, the fuel cell is appropriately cooled to suit the traveling state of the vehicle (to suit the electric power generation state of the fuel cell), and it is therefore possible to prevent the electrolyte membrane from becoming dry when the vehicle is traveling.

Furthermore, the fuel cell system is designed so that rotation of the radiator fan stops when the vehicle is stopped and the electric power generation of the fuel cell is stopped. As a result, wasteful electric power consumption by the radiator fan can be prevented.

SUMMARY

However, in the fuel cell system disclosed in Japanese Unexamined Patent Application, First Publication No. 2006-325392, there is a problem described below.

Since the cooling device of the fuel cell and the control thereof are designed in consideration of a vehicle in a state of traveling, the fuel cell may not be cooled well in those cases where electric power generated by the fuel cell is being supplied to an external load (hereunder, referred to as "external power feeding") while the vehicle is stopped. In particular, external power feeding is performed by generating electric power with the fuel cell in the state where the vehicle is stopped, and therefore no traveling air stream can be introduced to the radiator. Accordingly, the fuel cell cannot be cooled efficiently, and the temperature of the fuel cell may become significantly higher than that observed when the vehicle is in the traveling state. Furthermore, no disclosure is made in the conventional technique as to cooling of the fuel cell at the time of performing external power feeding.

Therefore, in the conventional technique, it may be brought to a dry-up condition where the electrolyte membrane of the fuel cell becomes excessively dry, and external power feeding may not be stably performed over a prolonged period of time.

An aspect of the present invention takes into consideration the above circumstances, with an object of providing an electric power supply system capable of stably performing external power feeding with electric power generated by a fuel cell for along time.

The aspect of the present invention employs the following measures in order to solve the above problems and achieve the object.

(1) An electric power supply system of an aspect of the present invention comprises: a power supply provided with a fuel cell that generates electric power with a fuel gas and an oxidant gas; a vehicle that is driven with electric power supplied from the power supply; an external power feeding circuit capable of supplying electric power supplied from the power supply to an external load; a radiator that releases heat of a coolant for cooling the fuel cell; a radiator fan that blows air to the radiator; a dryness detection device that detects a dry condition of the fuel cell; and a control device that controls supply of electric power to the external load. The control device drives the radiator fan in a case where the dryness detection device detects dryness of the fuel cell while electric power is being supplied from the power supply to the external load.

According to the aspect of (1) above, there are provided the dryness detection device that detects dryness of the fuel cell, and the control device that controls supply of electric power to an external load, and the control device drives the radiator fan in a case where the dryness detection device detects dryness of the fuel cell while electric power is being supplied to the external load. Therefore, the fuel cell can be cooled before the fuel cell is brought to a dry-up condition where it is excessively dry. As a result, it is possible to prevent power generation performance of the fuel cell from being reduced, and prevent deterioration in the electrolyte membrane, and it is therefore possible to stably perform external power feeding with electric power generated by the fuel cell over a prolonged period of time.

(2) In the aspect of (1) above, when the dryness detection device is not detecting dryness of the fuel cell, the control device may drive the radiator fan at a rotation speed that corresponds to the electric power consumption of the external load, and when the dryness detection device detects dryness of the fuel cell, it may drive the radiator fan at the highest rotation speed.

In the case of (2) above, since the radiator fan is driven even when the dryness detection device is not detecting dryness of the fuel cell, it is possible to reliably prevent the fuel cell from being brought to a dry-up condition. Furthermore, at this time, since the radiator fan is driven at a rotation speed that corresponds to the electric power consumption of the external load, it is possible to drive the radiator fan at a rotation speed that corresponds to the amount of generated heat of the fuel cell. Therefore, it is possible to prevent electric power from being wastefully consumed by the radiator fan.

Moreover, since the radiator fan is driven at the highest rotation speed when the dryness detection device detects dryness of the fuel cell, it is possible to rapidly cool the fuel cell after a dryness detection has been made by the dryness detection device. Therefore, it is possible to reliably prevent the fuel cell from being brought to a dry-up condition.

(3) In the aspect of either one of (1) and (2) above, the dryness detection may be performed by the dryness detection device measuring an impedance of the fuel cell, and the dryness detection device may detect a dryness condition of the fuel cell when the impedance of the fuel cell is at or above a predetermined value.

In the case of (3) above, since the impedance of the fuel cell is directly measured, it is possible, from this impedance value, to accurately identify a dry condition or wet condition of the fuel cell. Therefore, dryness of the fuel cell can be detected at a high level of precision and the fuel cell can perform electric power generation over a wider range, and accordingly, it is possible to stably perform external power feeding with electric power generated by the fuel cell over an even more prolonged period of time.

According to the aspect of the present invention, there are provided the dryness detection device that detects dryness of the fuel cell, and the control device that controls supply of electric power to an external load, and the control device drives the radiator fan in a case where the dryness detection device detects dryness of the fuel cell while electric power is being supplied to the external load. Therefore, the fuel cell can be cooled before the fuel cell is brought to a dry-up condition where it is excessively dry. As a result, it is possible to prevent power generation performance of the fuel cell from being reduced, and prevent deterioration in the electrolyte membrane, and it is therefore possible to stably perform external power feeding with electric power generated by the fuel cell over a prolonged period of time.

DESCRIPTION OF EMBODIMENTS

Hereunder, an embodiment of the present invention is described, with reference to the drawings. Hereunder, among vehicles, a fuel cell vehicle that travels primarily with electric power generated by a fuel cell, and an electric power supply system to be mounted on a fuel cell vehicle are described as an example. The front-rear and left-right orientations in the following description are treated as the same as the orientations in the vehicle unless otherwise described. Moreover, in the respective figures, arrow FR denotes the vehicle front side, arrow LH denotes the vehicle left side, and arrow UP denotes the vehicle upper side.

Figure 1:
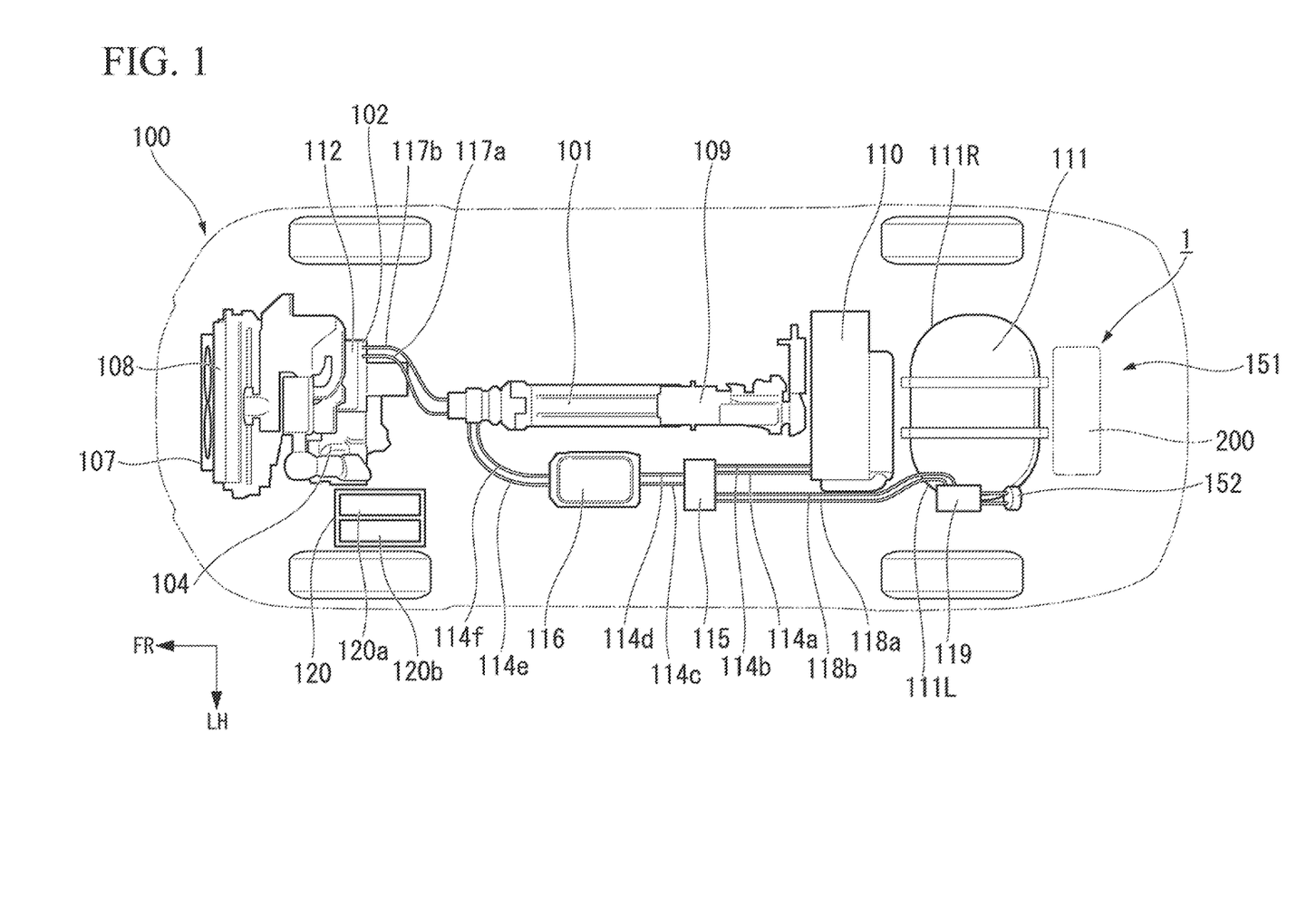
FIG. 1 is a schematic plan view of a fuel cell vehicle of an embodiment.

FIG. 1 is a schematic plan view of a fuel cell vehicle 100 (vehicle).

An electric power supply system 1 of the present embodiment is a system that primarily supplies electric power generated by a fuel cell 101 provided on the fuel cell vehicle 100 side, to an external load 300 (refer to FIG. 3) via an inverter device 200 (external power feeding circuit).

As shown in FIG. 1, the fuel cell vehicle 100 of the present embodiment is mounted with a fuel cell stack (FC: fuel cell) 101 (power supply) that generates electric power with an electrochemical reaction between hydrogen and oxygen (hereunder, referred to as "fuel cell 101"), and it travels with a driving motor 102 that is driven by electric power generated by the fuel cell 101.

The fuel cell vehicle 100 is such that inside a luggage compartment 151 at the rear of the vehicle, there is provided a power feed opening 152 that is electrically connected to the fuel cell 101, and the inverter device 200 that is provided as a separate device from the fuel cell vehicle 100 can be mounted within the luggage compartment 151.

The fuel cell vehicle 100 and the inverter device 200 form an electric power supply system such that a connector part 251 (refer to FIG. 2) of the inverter device 200 is electrically connected to the power feed opening 152 of the fuel cell vehicle 100. As a result, direct current electric power generated by the fuel cell 101 is converted into alternating current electric power by the inverter device 200, and then it can be supplied to an external alternating current device (external load 300, refer to FIG. 3).

The fuel cell 101 is a commonly known proton exchange membrane fuel cell (PEMFC), in which a plurality of unit fuel cells (unit cells) are stacked together, and by supplying a hydrogen gas as a fuel gas to an anode side thereof, and supplying air containing oxygen as an oxidant gas to a cathode side thereof, it generates electric power and produces water by an electrochemical reaction.

On the front side of the vehicle cabin, there are supported a driving motor 102, which is a driving source of the vehicle, and an air pump 104 that compresses air to be supplied to the cathode side of the fuel cell 101. On the front side of the driving motor 102 and the air pump 104, there are arranged a radiator 108 that releases heat of cooling water (coolant) circulating in the fuel cell 101 and so forth, and a radiator fan 107 that blows air to the radiator 108.

At the intermediate part in the vehicle lengthwise direction, there are supported the fuel cell 101 and auxiliary devices 109 of the fuel cell 101. The auxiliary devices 109 for the fuel cell 101 include hydrogen supply auxiliary devices such as a regulator and an ejector, and air discharge auxiliary devices such as a humidifier and a diluter box.

At the rear part of the vehicle, there are primarily supported a high voltage battery 110 (power supply) for accumulating regenerative electric power supplied from the driving motor 102 when the fuel cell vehicle 100 is decelerating, and a hydrogen tank 111 for supplying hydrogen to the fuel cell 101.

Figure 3:
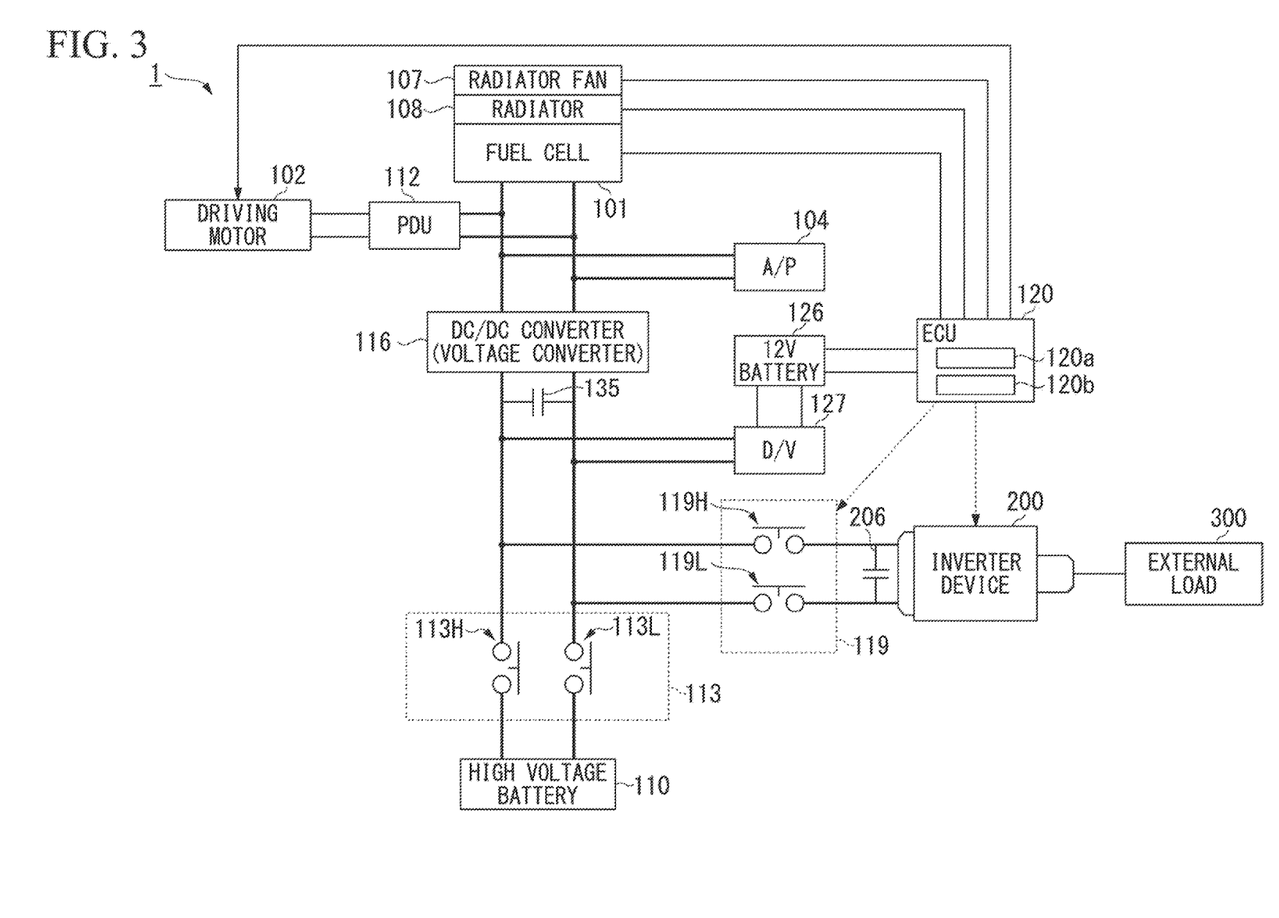
FIG. 3 is a block diagram for describing a part of a control system in an electric power supply system.

The high voltage battery 110 is electrically connected to the fuel cell 101 via high voltage cables 114a through 114f, battery contactors 113 (113H, 113L) within a junction box 115, and a DC/DC converter 116 and smoothing capacitor 135 (for both of these, refer to FIG. 3). Furthermore, the fuel cell 101 is electrically connected to a PDU 112 via high voltage cables 117a and 117b. Thereby, the fuel cell 101 and the high voltage battery 110 are electrically connected to the PDU 112.

The junction box 115 is electrically connected to a power feed contactor 119 described later and to the power feed opening 152 via high voltage cables 118a and 118b.

The DC/DC converter 116 regulates voltages between the PDU 112, the fuel cell 101, and the high voltage battery 110 according to the traveling status of the fuel cell vehicle 100, the electric power amount of the fuel cell 101, and the electric power amount of the high voltage battery 110.

The hydrogen tank 111 is of a substantially cylindrical shape, and axial direction end surfaces 111R and 111L are each formed in a spherical shape. The hydrogen tank 111 is arranged so that the axial line thereof is oriented in the left-right direction of the fuel cell vehicle 100.

Figure 2:
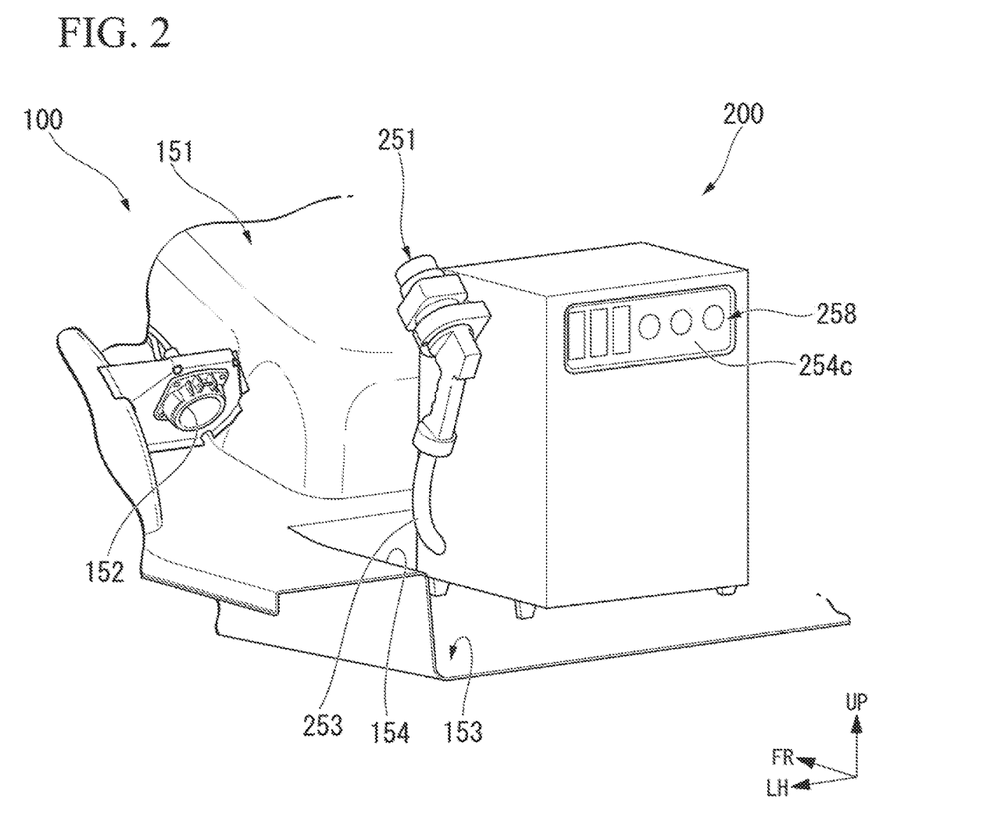
FIG. 2 is a perspective view of an inverter device arranged in a luggage compartment of the fuel cell vehicle, seen from the rear of the vehicle.

FIG. 2 is a perspective view of an inverter device 200 arranged in a luggage compartment 151 of the fuel cell vehicle 100, seen from the rear of the vehicle. FIG. 2 illustrates a state where the connector part 251 of the inverter device 200 and the power feed opening 152 of the fuel cell vehicle 100 are not connected.

The inverter device 200 has switching elements such as transistor and FET provided therein, and it converts direct current electric power supplied from the fuel cell 101 into alternating current electric power.

The inverter device 200 is provided as a separate device from the fuel cell vehicle 100, and is formed so that it can be moved separately from the fuel cell vehicle 100. The inverter device 200 is of a substantially box shape, and is formed with a size that allows it to be arranged in an inverter installation space 154 formed on a bottom part 153 of within the luggage compartment 151.

When in use, the inverter device 200 is installed in the inverter installation space 154 within the luggage compartment 151. Moreover, since the inverter device 200 is formed as a separate device from the fuel cell vehicle 100, it is possible to make effective use of the luggage compartment 151 by unloading the inverter device 200 from the luggage compartment 151 of the fuel cell vehicle 100 when not in use.

On the inverter device 200, there is provided a connection cable 253 that is formed with a plurality of cables tied together.

At the tip end part of the connection cable 253, there is formed the connector part 251. The connector part 251 is formed capable of engaging with the power feed opening 152 within the luggage compartment 151.

The connector part 251 is a so-called high voltage connector in which a male terminal composed of a metal material such as copper is provided inside a cylindrical housing composed of an insulating material such as resin. With the connector part 251 and the power feed opening 152 engaging with each other, the inverter device 200 and the power feed opening 152 are electrically connected. As a result, the inverter device 200 is electrically connected to the fuel cell 101 via the power feed contactors 119 (119H, 119L) mounted on the fuel cell vehicle 100, the high voltage cables 118a, 118b, and the smoothing capacitor 206 (refer to FIGS. 1 and 3). On either one of the connector part 251 and the power feed opening 152, there may be provided an engagement detection device such as a micro switch for engagement detection, and an engagement detection terminal that is connected electrically (not shown in the figure). Thereby, it is possible to easily determine that the inverter device 200 is connected to the fuel cell vehicle 100, and the fuel cell vehicle 100 is in an external power feeding state.

Among a plurality of side surfaces of the inverter device 200, on a side surface 254c that faces the rear side of the fuel cell vehicle 100, there is formed an alternating current electric power output part 258. To the alternating current electric power output part 258, there is connected an external alternating current device not shown in the figure (external load 300, refer to FIG. 3), and it receives supply of alternating current electric power output from the inverter device 200.

(Control Device)

FIG. 3 is a block diagram for describing a part of a control system in an electric power supply system 1.

As shown in FIG. 3, the electric power supply system 1 is provided with an ECU 120 (electrical control unit) that controls supply of electric power to an external load 300.

The ECU 120, based on signals output from various types of sensors and switches, calculates a target torque of the driving motor 102, and executes feedback control on the electric current supplied to the driving motor 102 so that the actual torque output from the driving motor 102 matches the target torque.

Moreover, for example by controlling; electric power conversion operations of an air pump inverter, opening/closing of various valves provided on reactive gas flow paths, and voltage regulating operations of a voltage regulator, the ECU 120 controls supply of reactive gas to the fuel cell 101 and the amount of electric power generation of the fuel cell 101.

Furthermore, for example based on signals output from various sensors and switches, and also on signals output from the inverter device 200, the ECU 120 performs control for monitoring and protection of a high voltage electrical system including the high voltage battery 110.

For example, based on command signals of an ignition switch and a power switch, and detection signals of a speed sensor, an accelerator pedal opening sensor, and a brake pedal switch, the ECU 120 controls the driving status of the fuel cell vehicle 100 (refer to FIG. 1).

The ECU 120 of the present embodiment is provided with a dryness detection device 120a and a cooling control device 120b.

The dryness detection device 120a is connected to the fuel cell 101, and determines whether or not the fuel cell 101 (electrolyte membrane) is in a dry state. As a method of determining whether or not the fuel cell 101 is in the dry state, for example, a predetermined alternating current is conducted to the electrolyte membrane inside the fuel cell 101, and based on the voltage behavior at the time, an impedance of the electrolyte membrane (hereunder, referred to as "impedance of fuel cell 101") is calculated. Then the dryness detection device 120a determines whether or not the fuel cell 101 is in a dry state, based on the magnitude of the impedance of the fuel cell 101.

Figure 4:
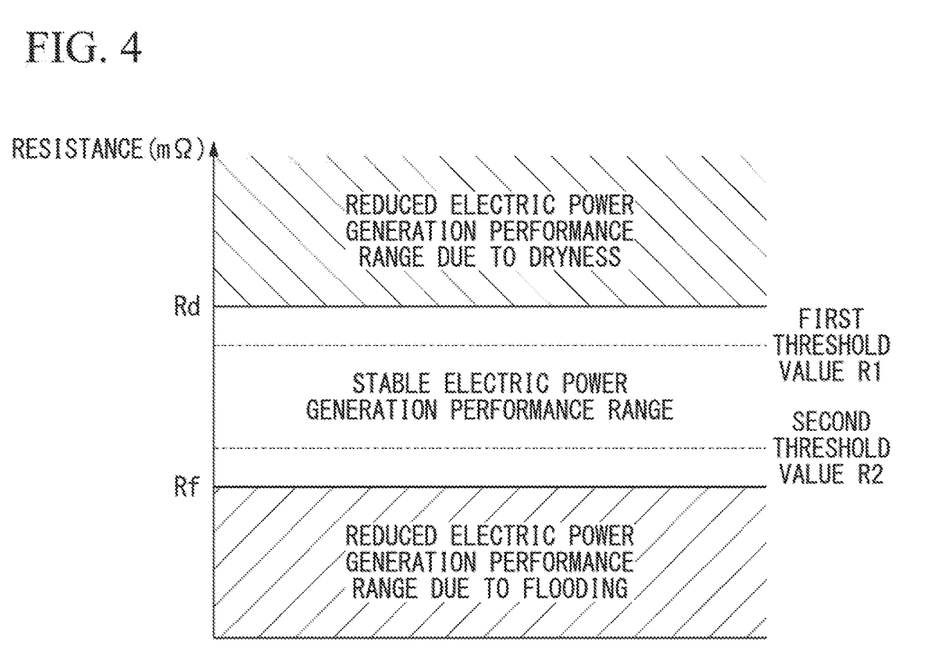
FIG. 4 is an explanatory diagram of a dryness detection device.

FIG. 4 is an explanatory diagram of the dryness detection device 120a. For reference symbols of respective components in the description of the dryness detection device 120a, refer to FIG. 1 and FIG. 2.

Determination of whether or not the fuel cell 101 is in the dry state is performed specifically as described below.

As shown in FIG. 4, if the impedance of the fuel cell 101 measured by the dryness detection device 120a is at or above a first threshold value R1 (a predetermined value), the fuel cell 101 (electrolyte membrane) is determined as being in the dry state. Here, the first threshold value R1 is set to a value that is slightly below an impedance Rd of the fuel cell 101 in a so-called dry-up condition where the fuel cell 101 is excessively dry (hereunder, referred to as "dry-up impedance Rd"). Accordingly, as described later, by cooling the fuel cell 101 after the dryness detection device 120a has detected the dry condition of the fuel cell 101, it is possible to prevent the fuel cell 101 from being brought to the dry-up condition which results in the reduced electric power generation performance thereof.

Moreover, in addition to dryness detection of the fuel cell 101, the dryness detection device 120a may determine whether or not the fuel cell 101 (electrolyte membrane) is in a wet condition. Specifically, if the impedance of the fuel cell 101 measured by the dryness detection device 120a is at or below a second threshold value R2, the fuel cell 101 is determined as being in the wet condition. Here, the second threshold value R2 is set to a value that is slightly above an impedance Rf of the fuel cell 101 in a so-called flooding condition where the fuel cell 101 is excessively wet (hereunder, referred to as "flooding impedance Rf"). Accordingly, for example, by forcibly stopping cooling of the fuel cell 101 after the dryness detection device 120a has detected the wet condition of the fuel cell 101, it is possible to prevent the fuel cell 101 from being brought to the flooding condition which results which results in the reduced electric power generation performance.

Here, if the impedance of the fuel cell 101 measured by the dryness detection device 120a is at or above the dry-up impedance Rd, the electric power generation performance of the fuel cell 101 is reduced and is in a "reduced electric power generation performance range due to dryness".

Furthermore, if the impedance of the fuel cell 101 measured by the dryness detection device 120a is at or below the flooding impedance Rf, the electric power generation performance of the fuel cell 101 is reduced and is in a "reduced electric power generation performance range due to flooding".

Moreover, if the impedance of the fuel cell 101 measured by the dryness detection device 120a is lower than the dry-up impedance Rd and higher than the flooding impedance Rf, the electric power generation performance of the fuel cell 101 is in a good state, and is in a "stable electric power generation performance range".

In the cooling control of the fuel cell 101 described later, the radiator fan 107 (refer to FIG. 1) is controlled so that the impedance of the fuel cell 101 is not less than the second threshold value R2 and not greater than the first threshold value R1. As a result, the impedance of the fuel cell 101 is controlled reliably so as to be lower than the dry-up impedance Rd and higher than the flooding impedance Rf, and the fuel cell 101 is in the "stable electric power generation performance range". Therefore, the fuel cell 101 can stably generate electric power.

Moreover, as shown in FIG. 3, the ECU 120 is connected to a 12V battery 126.

This ECU 120 uses 12V electric power supplied from the 12V battery 126 to operate.

This 12V battery 126 is connected via a downverter 127 to a high voltage cable that connects the DC/DC converter 116 and the high voltage battery 110. In the present embodiment, electric power supplied from the fuel cell 101 via the high voltage battery 110 and the DC/DC converter 116 has the voltage thereof lowered by the downverter 127, and then it is supplied to the 12V battery 126.

The air pump 104 is connected to a high voltage cable that connects the fuel cell 101 and the DC/DC converter 116. This air pump 104 is a reactive gas supply device that is driven by the ECU 120, rotates at controlled rotation speeds, and supplies a reactive gas used by the fuel cell 101.

The cooling control device 120b is connected to the radiator fan 107, and rotates the radiator fan 107 at a predetermined rotation speed, for example based on information such as; a result of determination of whether or not the fuel cell vehicle 100 is performing external power feeding, a result of determination of whether or not the fuel cell 101 (electrolyte membrane) is in the dry condition, a generated heat amount of the fuel cell 101, and an amount of electric power supply to the external load 300. The specific method of the control is described later.

(Fuel Cell Cooling Control Method at the Time of External Power Feeding)

Figure 5:
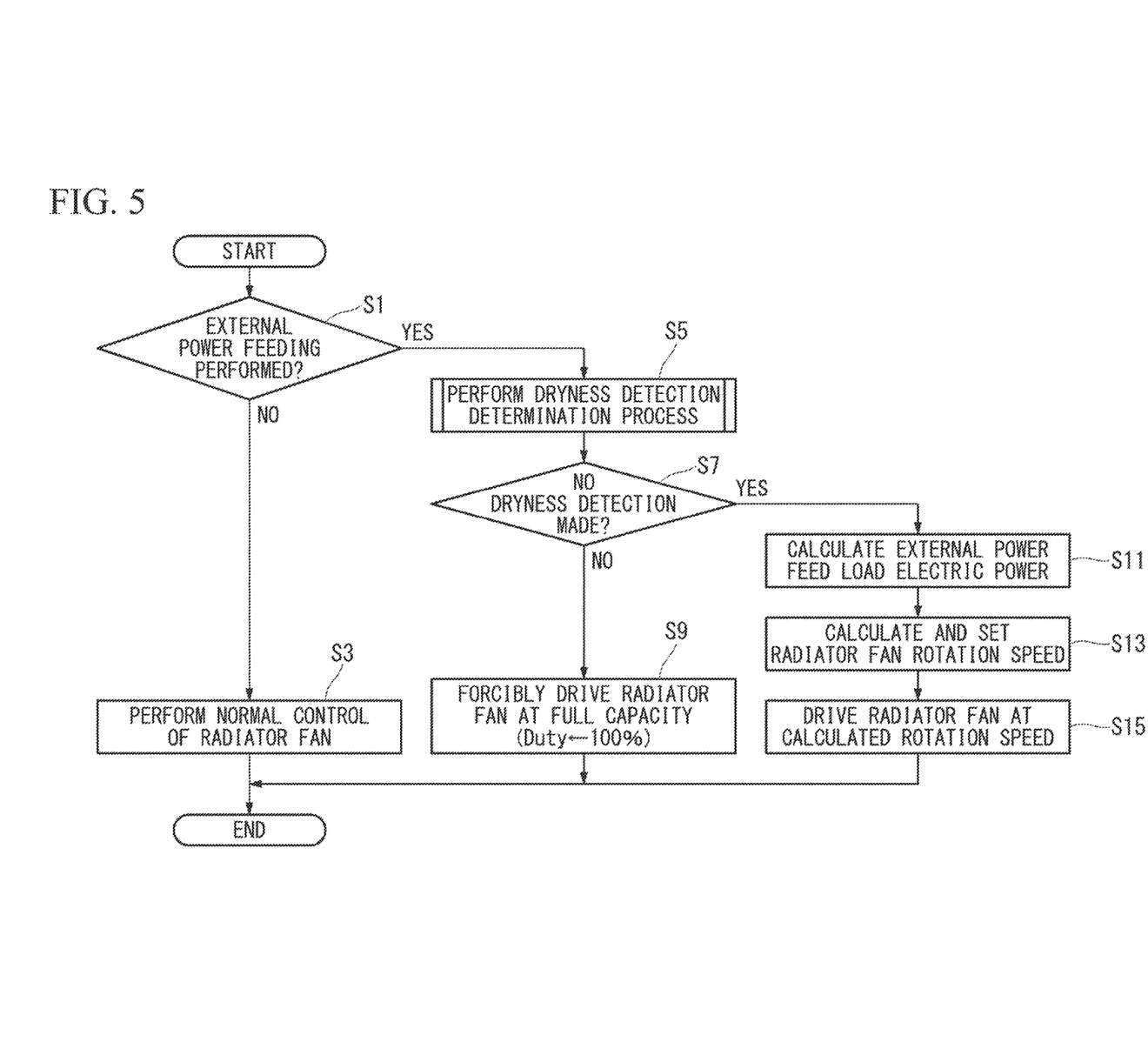
FIG. 5 is a flow chart of cooling control of the fuel cell performed at the time of performing external power feeding.

FIG. 5 is a flow chart of a cooling control method of the fuel cell 101 at the time of performing external power feeding.

Next, each step of the cooling control of the fuel cell 101 at the time of performing external power feeding (step S1 through S15) is described, using FIG. 5. The flow chart shown in FIG. 5 illustrates a sequence of steps of a process performed by the ECU 120 when external power feeding is performed.

Therefore, when one sequence of steps from START to END on the flow chart shown in FIG. 5 is finished, the ECU 120 executes the process from START again, and repeatedly executes the process flow of this flow chart. Moreover, for reference symbols of respective components in the following description of the cooling control method of the fuel cell 101, refer to FIG. 1 through FIG. 3.

(Step S1)

As shown in FIG. 5, in the cooling control of the fuel cell 101 at the time of performing external power feeding, first, in step S1, it is determined whether or not electric power is being supplied from the fuel cell vehicle 100 to an external load 300, that is, whether or not external power feeding is being performed. The determination of whether or not external power feeding is being performed is performed, for example, by the ECU 120 obtaining; an engagement detection signal of the engagement detection device provided on either one of the connector part 251 and the power feed opening 152, a state of the ignition switch, and a vehicle speed.

In step S1, if the fuel cell vehicle 100 is determined as not performing external power feeding (NO), the process proceeds to step S3. On the other hand, in step S1, if the fuel cell vehicle 100 is determined as performing external power feeding (YES), the process proceeds to step S5.

(Step S3)

In step S3, normal control of the radiator fan 107 is performed. Here, the normal control of the radiator fan 107 refers to control that is performed when the fuel cell vehicle 100 is traveling normally.

As a specific method for performing the normal control of the radiator fan 107, the cooling control device 120b calculates a rotation speed of the radiator fan 107 that corresponds to a vehicle speed of the fuel cell vehicle 100, and controls the rotation speed of the radiator fan 107. For example, if the vehicle speed of the fuel cell vehicle 100 is high, the cooling control device 120b causes the radiator fan 107 to rotate at a high speed. Moreover, if the vehicle speed of the fuel cell vehicle 100 is low, the cooling control device 120b causes the radiator fan 107 to rotate at a low speed. Furthermore, if the fuel cell vehicle 100 is in an idling state, the cooling control device 120b stops the rotation of the radiator fan 107.

When the radiator fan 107 is driven with the normal control, step S3 is finished, and the cooling control flow of the fuel cell 101 at the time of performing external power feeding is finished.

(Step S5)

Figure 6:
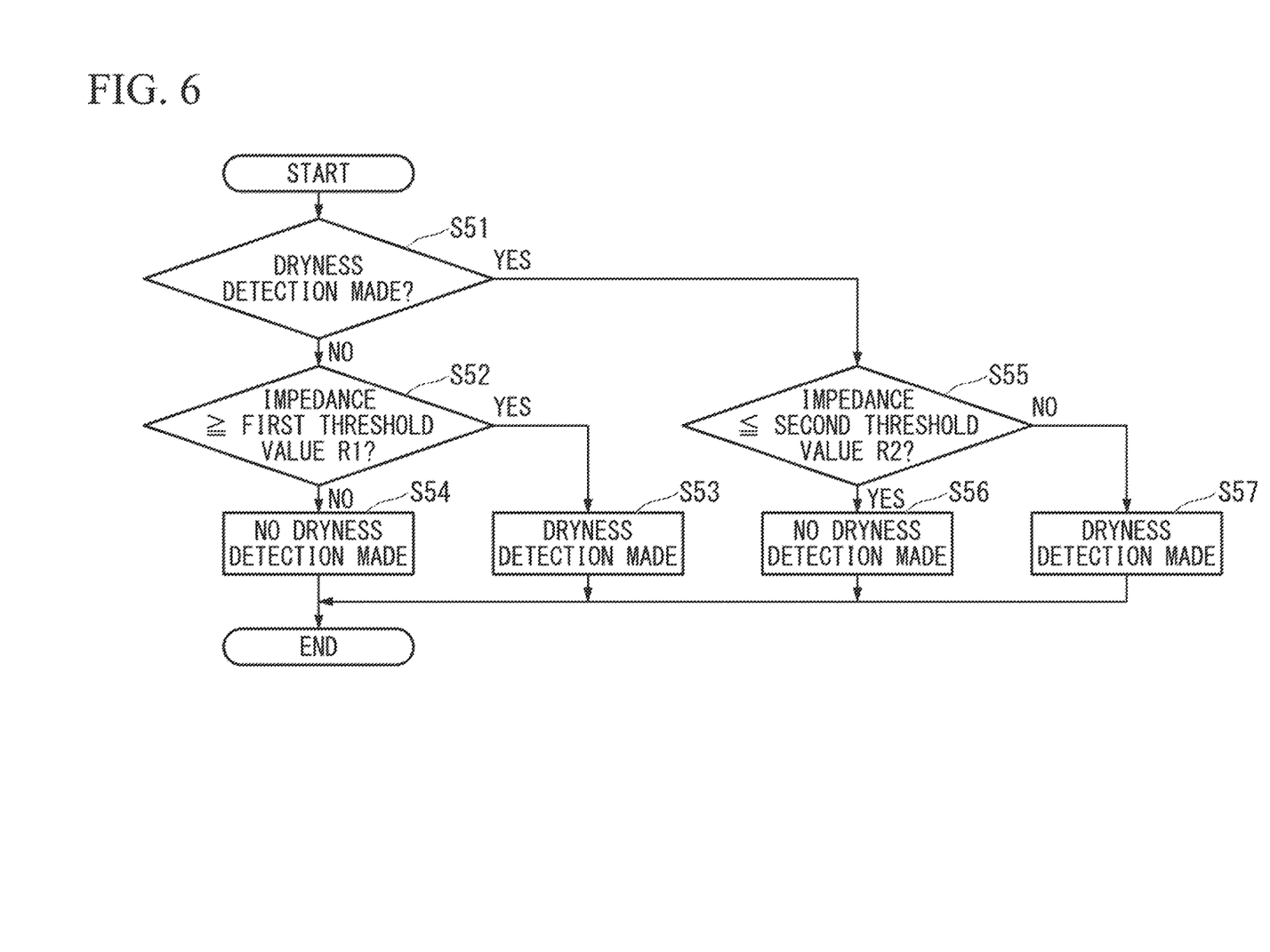
FIG. 6 is a flow chart of a dryness detection determination process in the cooling control of the fuel cell.

FIG. 6 is a flow chart of a dryness detection determination process (step S5) of the cooling control of the fuel cell 101, performed by the dryness detection device 120a.

In step S5, there is performed a dryness detection determination process for detecting whether or not the fuel cell 101 is in the dry condition. The dryness detection determination process is performed by the dryness detection device 120a inside the ECU 120 calculating an impedance of the fuel cell 101. Hereunder, each step of the dryness detection determination process (step S51 through S57) is described, using FIG. 6.

(Step S51)

In the dryness detection determination process, first in step S51, it is determined whether or not a detection of dryness to be described later was made in the dryness detection determination process that was performed previously. Information of whether or not a detection of dryness was made in the previously performed dryness detection determination process is stored in an EEPROM (electrically erasable programmable read only memory) or the like provided in the ECU 120 for example. If "no dryness detection was made" (NO) in the previously performed dryness detection determination process, the process proceeds to step S52. On the other hand, if a "dryness detection was made" (YES) in the previously performed dryness detection determination process, the process proceeds to step S55.

(Step S52, S53, S54)

In step S52, the dryness detection device 120a calculates the impedance of the fuel cell 101, and compares it with the first threshold value R1.

As shown in FIG. 4, in step S52, if the impedance of the fuel cell 101 is determined as being at or above the first threshold value R1 (YES), there is a possibility that the fuel cell 101 may reach the "reduced electric power generation performance ranged due to dryness", and it is therefore determined as "dryness detection has been made" (step S53). Then, this determination result is stored for example in the EEPROM or the like in the ECU 120.

On the other hand, in step S52, if the impedance of the fuel cell 101 is determined as being lower than the first threshold value R1 (NO), it can be the that the impedance of the fuel cell 101 is reliably lower than the first threshold value R1, since "no dryness detection was made" in the previously performed dryness detection determination process. Therefore, in step S52, if the impedance of the fuel cell 101 is determined as being lower than the first threshold value R1 (NO), it is determined that "no dryness detection was made" since there is no possibility of the "reduced electric power generation performance range due to dryness" being reached (step S54).

When the above determination is finished, the dryness detection determination process (step S5) is finished.

(Step S55, S56, S57))

In step S55, the dryness detection device 120a calculates the impedance of the fuel cell 101, and compares it with the second threshold value R2.

In step S55, if the impedance of the fuel cell 101 is determined as being higher than the second threshold value R2 (NO), it is determined that a "dryness detection was made" (step S57) since the "dryness detection was made" in the previously performed dryness detection determination process. Then, this determination result is stored for example in the EEPROM or the like in the ECU 120.

On the other hand, in step S55, if the impedance of the fuel cell 101 is determined as being lower than the second threshold value R2 (YES), the impedance of the fuel cell 101 is sufficiently low and there is no possibility of the "reduced electric power generation performance range due to dryness" being reached. Thereafter, it is determined that "no dryness detection was made" (step S56).

When the above determination is finished, the dryness detection determination process (step S5) is finished.

(Step S7)

As shown in FIG. 5, when the dryness detection determination process (step S5) is finished, in step S7, the determination results of the dryness detection determination process (step S5) is determined. If it is determined that a "dryness detection was made" in the dryness detection determination process (step S5), NO is determined in step S7, and the process proceeds to step S9. On the other hand, if it is determined that "no dryness detection was made" in the dryness detection determination process (step S5), YES is determined in step S7, and the process proceeds to step S11.

(Step S9)

After NO (that is, "dryness detection was made") has been determined in step S7, in step S9, the radiator fan 107 is forcibly driven at full capacity. Specifically, the cooling control device 120b drives the radiator fan 107 while taking the driving DUTY of the radiator fan 107 as being 100%.

Here, the driving DUTY refers to a ratio of conduction-ON time to a driving time of the radiator fan 107, and the rotation speed of the radiator fan 107 becomes higher as the driving DUTY becomes higher. Therefore, by making the driving DUTY 100%, the radiator fan 107 is driven at full capacity.

When the radiator fan 107 is driven at full capacity, step S9 is finished, and the cooling control flow of the fuel cell 101 at the time of performing external power feeding is finished.

(Step S11)

On the other hand, after YES (that is, "no dryness detection was made") has been determined in step S7, in step S11, the ECU 120 calculates electric power consumed by the external load 300 (hereunder, referred to as "external power feed load electric power"). The external power feed load electric power is used for the cooling control device 120b to calculate a rotation speed of the radiator fan 107 in the next step S13 and thereafter.

(Step S13)

Figure 7:
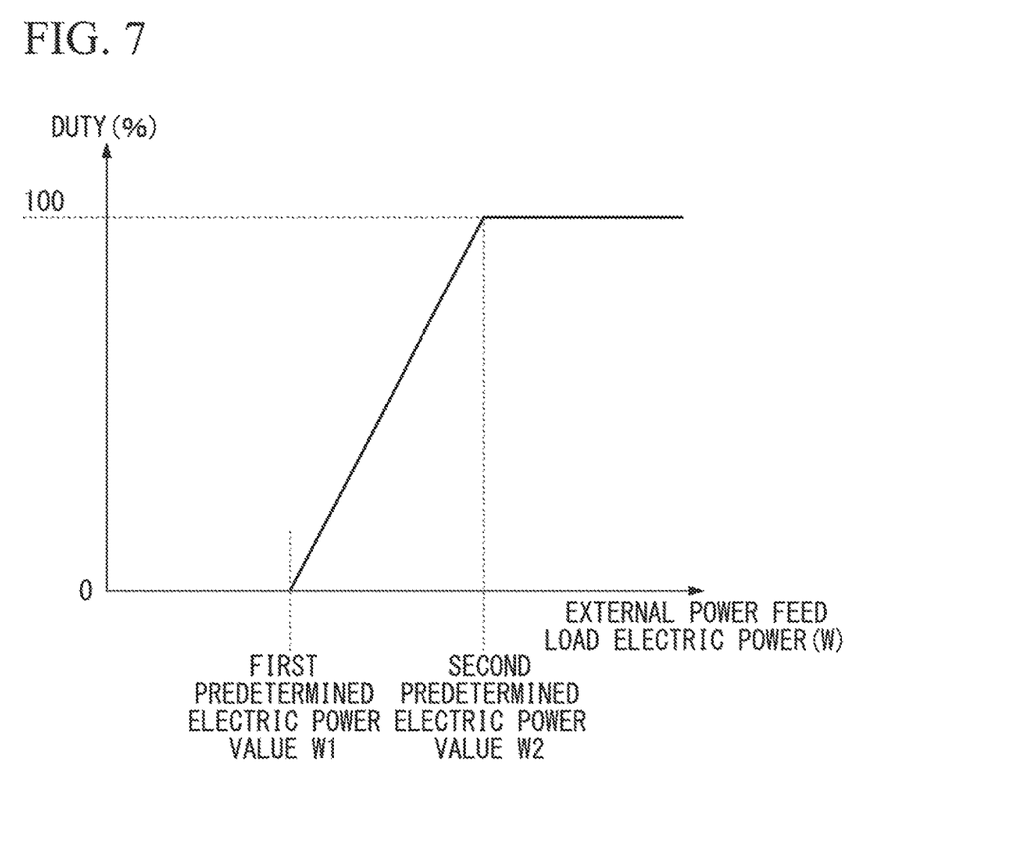
FIG. 7 is an explanatory diagram of driving DUTY of a radiator fan.

FIG. 7 is an explanatory diagram of driving DUTY of the radiator fan 107. In FIG. 7, the horizontal axis represents external power feed load electric power (W), and the vertical axis represents driving DUTY of the radiator fan 107.

In step S13, the cooling control device 120b uses the external power feed load electric power calculated in step S11 to calculate and set the rotation speed of the radiator fan 107 (that is, the driving DUTY of the radiator fan 107). The driving DUTY of the radiator fan 107 is calculated, for example, using the map shown in FIG. 7, based on the value of the external power feed load electric power.

As shown in FIG. 7, for example, if the external power feed load electric power is less than a first predetermined electric power value W1 (for example, 7,000 W in the present embodiment), the electric power generation amount of the fuel cell 101 is not very high, and the heat generation amount of the fuel cell 101 is also low. Therefore, if the external power feed load electric power is not more than the first predetermined electric power value W1, the driving DUTY of the radiator fan 107 is set to 0% (that is, the rotation of the radiator fan 107 is stopped) in order to suppress wasteful consumption of electric power.

Moreover, for example, if the external power feed load electric power is not less than the first predetermined electric power value W1 and is less than a second predetermined electric power value W2, the driving DUTY of the radiator fan 107 is set so as to correspond to the external power feed load electric power (that is, the electric power consumption of the external load 300).

For example, in a range where the external power feed load electric power is not less than the first predetermined electric power value W1 and is less than the second predetermined electric power value W2, the driving DUTY of the radiator fan 107 is mapped so as to gradually increase to correspond to the increase in the external power feed load electric power. Based on this map, the driving DUTY of the radiator fan 107 is calculated and set. The map of the driving DUTY and the external power feed load electric power shown in FIG. 7 is an example, and is not limited to this example.

Furthermore, for example, if the external power feed load electric power is not less than the second predetermined electric power value W2, the electric power generation amount of the fuel cell 101 is high and the heat generation amount of the fuel cell 101 is also high. Therefore, if the external power feed load electric power is not less than the second predetermined electric power value, the fuel cell 101 is cooled rapidly, and the driving DUTY of the radiator fan 107 is set to 100% (that is, the radiator fan 107 is driven with its full capacity and at the full rotation speed) in order to prevent the fuel cell 101 from being brought to the dry condition.

(Step S15)

In step S15, the cooling control device 120b rotates the radiator fan 107 so that the driving DUTY of the radiator fan 107 calculated and set in step S13 is achieved. Since the radiator fan 107 is driven at a rotation speed that corresponds to the electric power consumption of the external load 300 in this manner, it is possible to drive the radiator fan 107 at a rotation speed that corresponds to the heat generation amount of the fuel cell 101. Therefore, it is possible to prevent electric power from being wastefully consumed by the radiator fan 107.

When the radiator fan 107 is driven at the predetermined driving DUTY that corresponds to the external power feed load electric power, step S15 is finished, and the cooling control flow of the fuel cell 101 at the time of performing external power feeding is finished.

Figure 8:
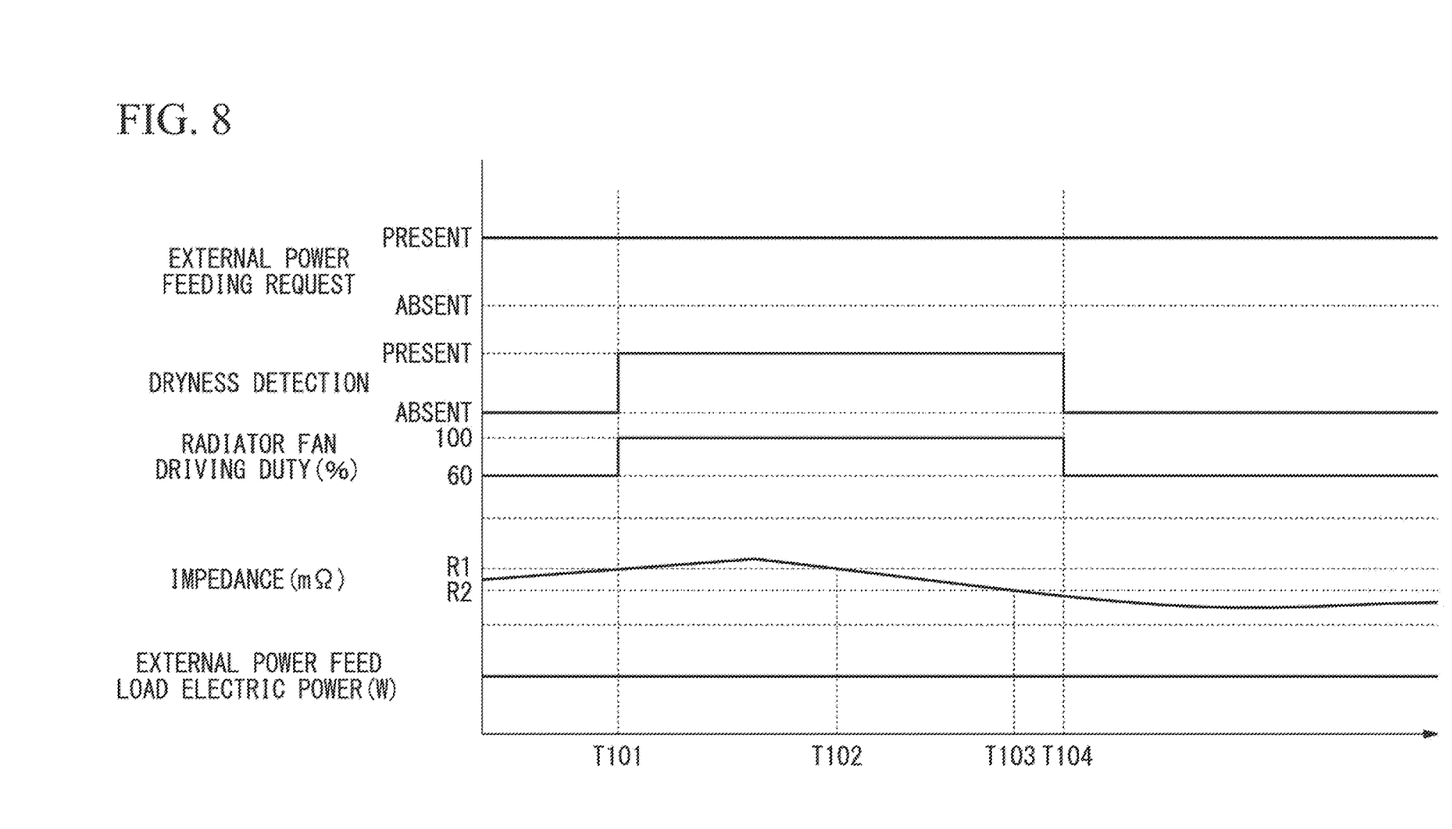
FIG. 8 is a time chart of a cooling control process of the fuel cell performed at the time of performing external power feeding.

FIG. 8 is a time chart of a cooling control process of the fuel cell 101 performed at the time of performing external power feeding.

Next, the timing chart of the process in the flow chart shown in FIG. 5 and FIG. 6 is described, with reference to FIG. 8. For the step at each timing in the following description, refer to FIG. 5 and FIG. 6.

FIG. 8 shows a state where, at the beginning of the time chart, external power feeding is performed in the state where the external power feed load is constant, and "YES" is determined in step S7 as "no dryness detection was made" in the previously performed dryness detection determination process (step S5). Therefore, the radiator fan 107 is driven, for example, at 60% driving DUTY that corresponds to the external power feed load electric power (step S11 through S15).

(Timing T101)

When the temperature of the fuel cell 101 rises as the fuel cell 101 generates electric power to correspond to the external power feeding, the electrolyte membrane of the fuel cell 101 starts to become dry and the impedance of the fuel cell 101 increases.

When the impedance of the fuel cell 101 becomes the first threshold value R1 or higher, the dryness detection device 120a determines "YES" in step S52 of the dryness detection determination process (step S5). Then, the dryness detection device 120a determines that a "dryness detection was made" (S53), and stores this determination result in the EEPROM or the like in the ECU 120.

Accordingly, in step S7, the ECU 120 determines the determination result of the dryness detection determination process (step S5) as being "dryness detection was made" (NO). Then, the cooling control device 120b increases the driving DUTY of the radiator fan 107, which was 60%, to 100%, and drives the radiator fan 107 at its full capacity (step S9).

(Timing T102)

At T101 and thereafter, when the radiator fan 107 is driven at 100% driving DUTY, cooling of the fuel cell 101 is promoted, and the impedance of the fuel cell 101 is gradually reduced. Then, the impedance of the fuel cell 101, which exceeded the first threshold value R1, reaches the first threshold value R1 again.

At this time, since a dryness detection was performed at the point in time prior to timing T102, the dryness detection device 120*a* determines that a "dryness detection was made" (YES) in step S51 of the dryness detection determination process (step S5).

Subsequently, the process proceeds to step S55. However, since the impedance of the fuel cell 101 is higher than the second threshold value R2, "NO" is determined in step S55. Then, the dryness detection device 120*a* determines that a "dryness detection was made" (S57). After this, the ECU 120 continues to drive the radiator fan 107 at its full capacity (step S7 and step S9).

(Timing T103)

At T102 and thereafter, when the radiator fan 107 is driven at 100% driving DUTY, cooling of the fuel cell 101 is further promoted, and the impedance of the fuel cell 101 is further reduced. Then the impedance of the fuel cell 101 reaches the second threshold value R2.

At this time, since a dryness detection was performed at the point in time prior to timing T103, the dryness detection device 120*a* determines that a "dryness detection was made" (YES) in step S51 of the dryness detection determination process (step S5).

Subsequently, the process proceeds to step S55. However, since the impedance of the fuel cell 101 is not higher than the second threshold value R2, "YES" is determined in step S55. Then, the dryness detection device 120*a* determines that "no dryness detection was made" (S56).

(Timing T104)

After this, in step S7, the ECU 120 determines the determination result of the dryness detection determination process (step S5) as being "no dryness detection was made" (YES). Accordingly, the cooling control device 120*b* drives the radiator fan 107, for example, at 60% driving DUTY that corresponds to constant external power feed load electric power (step S11 through S15).

(Effect)

According to the present embodiment, there are provided the dryness detection device 120*a* that detects dryness of the fuel cell 101, and the ECU 120 that controls supply of electric power to an external load, and the ECU 120 drives the radiator fan 107 in a case where the dryness detection device 120*a* detects dryness of the fuel cell 101 while electric power is being supplied to the external load 300. Therefore, the fuel cell 101 can be cooled before the fuel cell 101 is brought to a dry-up condition where it is excessively dry. As a result, it is possible to prevent power generation performance of the fuel cell 101 from being reduced, and prevent deterioration in the electrolyte membrane, and it is therefore possible to stably perform external power feeding with electric power generated by the fuel cell 101 over a prolonged period of time.

Moreover, since the radiator fan 107 is driven even when the dryness detection device 120*a* is not detecting dryness of the fuel cell 101, it is possible to reliably prevent the fuel cell 101 from being brought to a dry-up condition. Furthermore, at this time, since the radiator fan 107 is driven at a rotation speed that corresponds to the electric power consumption of the external load 300, it is possible to drive the radiator fan 107 at a rotation speed that corresponds to the amount of generated heat of the fuel cell 101. Therefore, it is possible to prevent electric power from being wastefully consumed by the radiator fan 107.

Moreover, since the radiator fan 107 is driven at the highest rotation speed when the dryness detection device 120*a* detects dryness of the fuel cell 101, it is possible to rapidly cool the fuel cell 101 after a dryness detection has been made by the dryness detection device 120*a*. Therefore, it is possible to reliably prevent the fuel cell 101 from being brought to a dry-up condition.

Furthermore, since the impedance of the fuel cell 101 is directly measured, it is possible, from this impedance value, to accurately identify a dry condition or wet condition of the fuel cell 101. Therefore, dryness of the fuel cell 101 can be detected at a high level of precision and the fuel cell 101 can perform electric power generation over a wider range, and accordingly, it is possible to stably perform external power feeding with electric power generated by the fuel cell 101 over an even more prolonged period of time.

The technical scope of the present invention is not limited to the above embodiment, and various modifications may be made without departing from the spirit and scope of the invention.

The detection of dryness of the fuel cell 101 is performed by the dryness detection device 120*a* measuring an impedance of the fuel cell 101 in the embodiment above. However, it is not limited to this.

For example, a detection of dryness of the fuel cell 101 may be performed based on various information such as a heat generation state of the fuel cell 101, a traveling history of the fuel cell vehicle 100 until external power feeding starts, an electric generation amount of the fuel cell 101, and a voltage of the fuel cell 101, or based on a combination of the respective information.

The driving DUTY of the radiator fan 107 is mapped so as to correspond to the external power feed load electric power in the above embodiment. However, it is not limited to this. For example, the driving DUTY of the radiator fan 107 may be mapped based on combined information of an outside temperature and a temperature of the fuel cell 101, in addition to information of external power feed load electric power.

In the embodiment of the present invention, the external load 300 is not particularly limited, and it may be an electrical device to be connected to a power outlet, or another electric vehicle. It is not limited to an alternating current device, and it may be a direct current device.

The components in the embodiment described above may be appropriately replaced with commonly known components, without departing from the spirit and scope of the invention.

What is claimed is:

1. An electric power supply system comprising:
a power supply provided with a fuel cell that generates electric power with a fuel gas and an oxidant gas;
a vehicle that is driven with electric power supplied from the power supply;
an external power feeding circuit configured to supply electric power supplied from the power supply to an external load in a state where the vehicle is stopped;
a radiator that releases heat of a coolant for cooling the fuel cell;
a radiator fan that blows air to the radiator;
a dryness detection device that detects a dry condition of the fuel cell; and
a control device that controls supply of electric power to the external load, wherein
the external power feeding circuit connects a power feed opening provided in the vehicle and the external load outside the vehicle to supply electric power, is provided as a separate device from the vehicle, and is formed so as to be moved separately from the vehicle, and
the control device is programmed to cool the fuel cell by causing the radiator fan to drive in a case where the dryness detection device detects dryness of the fuel cell while electric power is being supplied from the power supply to the external load in the state where the vehicle is stopped after it is determined that the vehicle is in an external power feeding state based on a connection state between the power feed opening and the external power feeding circuit.

2. The electric power supply system according to claim 1, wherein when the dryness detection device is not detecting dryness of the fuel cell, the control device drives the radiator fan at a rotation speed that corresponds to electric power consumption of the external load, and when the dryness detection device detects dryness of the fuel cell, it drives the radiator fan at a highest rotation speed.

3. The electric power supply system according to claim 1, wherein the dryness detection is performed by the dryness detection device measuring an impedance of the fuel cell, and the dryness detection device detects a dryness condition of the fuel cell when the impedance of the fuel cell is at or above a predetermined value.

4. The electric power supply system according to claim 2, wherein the dryness detection is performed by the dryness detection device measuring an impedance of the fuel cell, and the dryness detection device detects a dryness condition of the fuel cell when the impedance of the fuel cell is at or above a predetermined value.

* * * * *